United States Patent
Park et al.

(10) Patent No.: US 9,203,670 B2
(45) Date of Patent: Dec. 1, 2015

(54) FRAME STRUCTURE FOR TERRESTRIAL CLOUD BROADCAST AND A METHOD OF RECEIVING THE SAME

(71) Applicant: Electronics and Telecommunications Research Institute, Daejeon-si (KR)

(72) Inventors: Sung Ik Park, Daejeon-si (KR); Heung Mook Kim, Daejeon-si (KR); Nam Ho Hur, Daejeon-si (KR); Jeong Chang Kim, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 197 days.

(21) Appl. No.: 13/906,030

(22) Filed: May 30, 2013

(65) Prior Publication Data

US 2013/0322369 A1 Dec. 5, 2013

(30) Foreign Application Priority Data

Jun. 1, 2012 (KR) .................. 10-2012-0059084
May 2, 2013 (KR) .................. 10-2013-0049197

(51) Int. Cl.
*H04W 4/00* (2009.01)
*H04L 27/26* (2006.01)

(52) U.S. Cl.
CPC .................. *H04L 27/2613* (2013.01)

(58) Field of Classification Search
CPC .................. H04H 20/72; H04W 16/14
USPC .................. 370/329; 455/95, 509
See application file for complete search history.

(56) References Cited

U.S. PATENT DOCUMENTS

| 2010/0022205 A1* | 1/2010 | Henry et al. ............ 455/95 |
| 2012/0320865 A1* | 12/2012 | Samarasooriya et al. ..... 370/329 |
| 2013/0122951 A1* | 5/2013 | Kim et al. ............ 455/509 |
| 2015/0023272 A1* | 1/2015 | Choi et al. ............ 370/329 |

* cited by examiner

*Primary Examiner* — Dang Ton
*Assistant Examiner* — Lionel Preval
(74) *Attorney, Agent, or Firm* — William Park & Associates Ltd.

(57) ABSTRACT

A transmitting/receiving apparatus and method for separating multiple broadcast signals in a terrestrial cloud broadcast service are provided. A method of transmitting a terrestrial cloud broadcast signal by a terrestrial cloud broadcast signal transmitting apparatus may include generating the terrestrial cloud broadcast signal based on a frame structure for terrestrial cloud broadcast, the frame structure including a plurality of sub-frames, wherein a first sub-frame of the sub-frames includes two or more preamble symbols and transmitting the generated terrestrial cloud broadcast signal.

17 Claims, 9 Drawing Sheets

FRAME STRUCTURE FOR TERRESTRIAL CLOUD BROADCAST AND A METHOD OF RECEIVING THE SAME

CROSS-REFERENCE TO RELATED APPLICATION

This application claims priority to Korean Patent Application No. 10-2012-0059084 filed on Jun. 1, 2012 and No. 10-2013-0049197 filed on May 2, 2013, the disclosure of which is incorporated by reference herein in its entirety.

TECHNICAL FIELD

Embodiments of the present invention are directed to a frame structure of a terrestrial cloud broadcast signal aiming to distinguish and demodulate multiple broadcast signals transmitted from transmitters different from each other and a method of transmitting and receiving the same.

DISCUSSION OF THE RELATED ART

Current terrestrial TV broadcast services cause co-channel interference that amounts to about three times the service coverage, and thus, the same frequency may not be reused in an area that is within three times the service coverage. As such, the area in which the same frequency may not be reused is referred to as white space. The white space results in a deterioration of spectrum efficiency. Accordingly, for better spectrum efficiency, a need is surfacing for a transmission technology to facilitate removal of the white space and reuse of the frequency, which focuses on robustness in reception, as well as to increase the capacity of transmission.

As part of such an effort, there has been suggested a terrestrial cloud broadcast technology that allows a single frequency network to be easily established and operated without causing a white space and provides for frequency reuse in a research document entitled "Cloud Transmission: A New Spectrum-Reuse Friendly Digital Terrestrial Broadcasting Transmission System" published on September 2012 though IEEE Transactions on Broadcasting, vol. 58, no. 3.

A use of such a terrestrial cloud broadcast technology enables a broadcaster to transmit the same broadcast content nationwide or a different broadcast content to each local area through a single broadcast channel. However, for this purpose, a receiver should receive one or more terrestrial cloud broadcast signals at an area where signals transmitted from different transmitters overlap each other, i.e., "overlapping area," and should distinguish and demodulate the received terrestrial cloud broadcast signals. In other words, under the situation where co-channel interference exists and timing and frequency sync between the transmitted signals is not ensured, the receiver should demodulate one or more cloud broadcast signals.

SUMMARY

An object of the present invention is to provide a frame structure for a terrestrial cloud broadcast signal, which allows a plurality of terrestrial cloud broadcast signals to be distinguished and demodulated in a terrestrial cloud broadcast system.

Another object of the present invention is to provide an apparatus and method for being able to demodulate a terrestrial cloud broadcast signal transmitted in the frame structure.

According to an aspect of the present invention, a method of transmitting a terrestrial cloud broadcast signal by a terrestrial cloud broadcast signal transmitting apparatus may include generating the terrestrial cloud broadcast signal based on a frame structure for terrestrial cloud broadcast, the frame structure including a plurality of sub-frames, wherein a first sub-frame of the sub-frames includes two or more preamble symbols and transmitting the generated terrestrial cloud broadcast signal.

According to an embodiment of the present invention, each of the sub-frames may include a plurality of OFDM (Orthogonal Frequency Division Multiplexing) symbols.

According to another embodiment of the present invention, the first sub-frame may include a data symbol instead of a pilot symbol.

According to another embodiment of the present invention, the preamble symbols may be generated by mapping a predetermined number of sub-carriers spaced apart from each other at a predetermined distance among all sub-carriers with a sequence whose length corresponds to the number of the predetermined sub-carriers.

According to another embodiment of the present invention, a second preamble symbol of the preamble symbols may be generated by multiplying a sequence for generating the first preamble symbol by a sequence previously promised between a transmitter and a receiver.

According to another embodiment of the present invention, the sequence previously promised between the transmitter and the receiver may be different for each of terrestrial cloud broadcast signals so that the terrestrial cloud broadcast signals may be distinguished from each other.

According to another embodiment of the present invention, pilot symbols in the sub-frames may be generated by mapping a predetermined number of sub-carriers of all sub-carriers with a sequence previously promised between a transmitter and a receiver.

According to another embodiment of the present invention, positions of the sub-carriers may be the same for a plurality of terrestrial cloud broadcast signals.

According to another aspect of the present invention, a method of demodulating a terrestrial cloud broadcast signal by a terrestrial cloud broadcast signal receiving apparatus may include receiving a terrestrial cloud broadcast signal generated based on a frame structure for terrestrial cloud broadcast, the frame structure including a plurality of sub-frames, wherein a first sub-frame of the sub-frames includes two or more preamble symbols, distinguishing terrestrial cloud broadcast signals from each other based on a preamble signal of the received terrestrial cloud broadcast signal, and demodulating the distinguished terrestrial cloud broadcast signals.

According to still another aspect of the present invention, a terrestrial cloud broadcast signal transmitting apparatus may include a generating unit generating a terrestrial cloud broadcast signal based on a frame structure for terrestrial cloud broadcast, the frame structure including a plurality of sub-frames, wherein a first sub-frame of the sub-frames includes two or more preamble symbols and a transmitting unit transmitting the generated terrestrial cloud broadcast signal.

According to yet still another aspect of the present invention, a terrestrial cloud broadcast signal receiving apparatus may include a receiving unit receiving a terrestrial cloud broadcast signal generated based on a frame structure for terrestrial cloud broadcast, the frame structure including a plurality of sub-frames, wherein a first sub-frame of the sub-frames includes two or more preamble symbols and a demodulating unit distinguishing terrestrial cloud broadcast signals from each other based on a preamble signal of the received terrestrial cloud broadcast signal and demodulating the distinguished terrestrial cloud broadcast signals.

In a terrestrial cloud broadcast system, a sequence previously promised between a receiver and a transmitter based on a frame structure for a terrestrial cloud broadcast signal is used to generate a terrestrial cloud broadcast signal. Thus, a terrestrial cloud broadcast signal receiving apparatus may distinguish and demodulate terrestrial cloud broadcast signals.

Even when correct timing and frequency sync is not secured for an individual terrestrial cloud broadcast signal, the terrestrial cloud broadcast signal may be demodulated.

BRIEF DESCRIPTION OF THE DRAWINGS

The embodiments of the present invention will become readily apparent by reference to the following detailed description when considered in conjunction with the accompanying drawings wherein.

DESCRIPTION OF EXEMPLARY EMBODIMENTS

Embodiments of the present invention will be described with reference to the accompanying drawings in such an extent that the present invention may be easily implemented by those of ordinary skill in the art. However, the present invention may be embodied in various other forms and is not limited to the embodiments disclosed herein. Parts of the present invention, which are irrelevant to the present invention, have been omitted from the drawings to clarity the invention, and similar denotations have been used to refer to similar elements throughout the specification.

As used herein, when an element "includes" another element, unless stated otherwise, the element may further include the other element, but not excluding the other element. As used herein, the term "unit" refers to a basis for processing at least one function or operation, and this may be implemented in hardware, software, or in a combination thereof.

Figure 1:
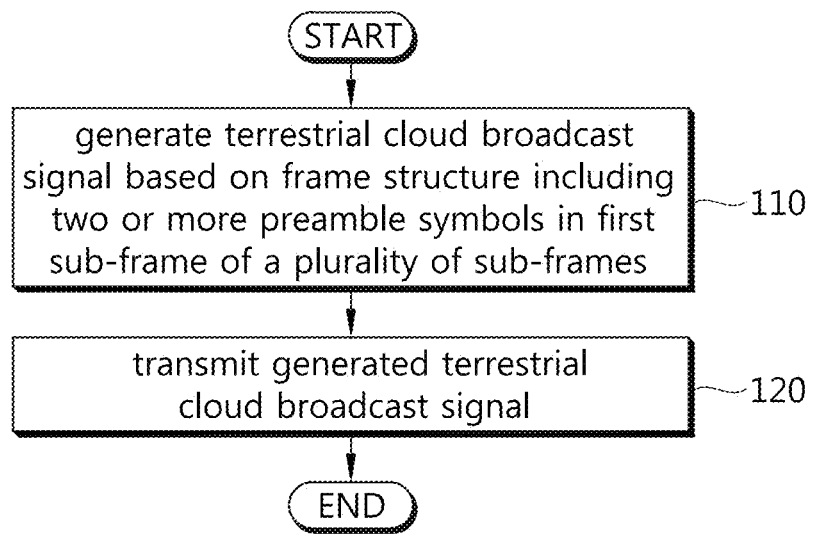
FIG. 1 is a flowchart illustrating a method of transmitting a terrestrial cloud broadcast signal according to an embodiment of the present invention.

FIG. 1 is a flowchart illustrating a method of transmitting a terrestrial cloud broadcast signal according to an embodiment of the present invention.

A frame for a terrestrial cloud broadcast signal according to the present invention includes one or more sub-frames, and one sub-frame includes one or more OFDM (Orthogonal Frequency Division Multiplexing) symbols.

Among the sub-frames constituting one frame, at least one sub-frame may include one or more preamble symbols. The other sub-frames each may include a reference or pilot symbol.

The terrestrial cloud broadcast signal transmitting apparatus according to the present invention, as shown in FIG. 1, may generate a terrestrial cloud broadcast signal, for example, based on a frame structure for terrestrial cloud broadcast, which includes a plurality of sub-frames including a first sub-frame that includes two or more preamble symbols (110). Here, each sub-frame may consist of a plurality of OFDM symbols. Further, the first sub-frame of the sub-frames may include a data symbol instead of the pilot symbol. That is, the first sub-frame may consist only of two or more preamble symbols and a plurality of data symbols.

For example, the terrestrial cloud broadcast signal transmitting apparatus may generate preamble symbols by mapping a predetermined number of sub-carriers spaced apart from each other at a predetermined distance on frequency among all the sub-carriers with a sequence whose length corresponds to the number of the predetermined sub-carriers. At this time, among the preamble symbols, a second preamble symbol may be generated by multiplying a sequence for generating the first preamble symbol by a sequence previously promised between the transmitter and the receiver. The sequence previously promised between the transmitter and the receiver may vary depending on each terrestrial cloud broadcast signal so that the terrestrial cloud broadcast signals may be distinguished from each other.

Meanwhile, a preamble symbol positioned in a sub-frame may be generated by mapping the sequence previously promised between the transmitter and the receiver with positions of the predefined sub-carriers of all the sub-carriers. Here, the positions of the sub-carriers may be the same for a plurality of terrestrial cloud broadcast signals. However, the positions of the sub-carriers may be different from some terrestrial cloud broadcast signals.

The terrestrial cloud broadcast signal transmitting apparatus according to the present invention may transmit the terrestrial cloud broadcast signal generated by the above process (120).

Figure 2:
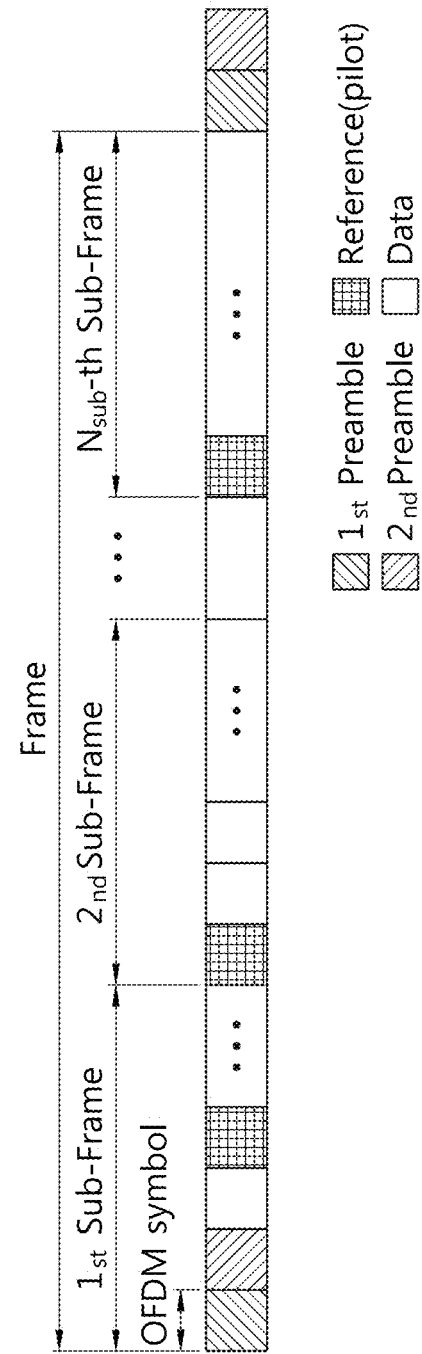
FIG. 2 is a view illustrating a frame structure for transmission and reception of a terrestrial cloud broadcast signal in the time domain according to an embodiment of the present invention.

FIG. 2 is a view illustrating a frame structure for transmission and reception of a terrestrial cloud broadcast signal in the time domain according to an embodiment of the present invention. Hereinafter, reference is made to FIG. 2 to detail the frame structure for a terrestrial cloud broadcast signal according to an embodiment of the present invention.

Referring to FIG. 2, one frame may consist of Nsub sub-frames, and one sub-frame may consist of one or more OFDM symbols.

A first sub-frame may consist of two preamble symbols, one or more pilot symbols and multiple data symbols. At this time, in the first sub-frame, the data symbol, instead of the pilot symbol, may be transmitted. That is, the first sub-frame may consist only of two preamble symbols and multiple data symbols.

Meanwhile, the preamble symbol may be present at a previously promised position in the first sub-frame. Each of the other (Nsub-1) sub-frames may consist of one or more pilot symbols and data symbols. In all the sub-frames, the pilot symbol may be present at a previously promised position.

Figure 3:
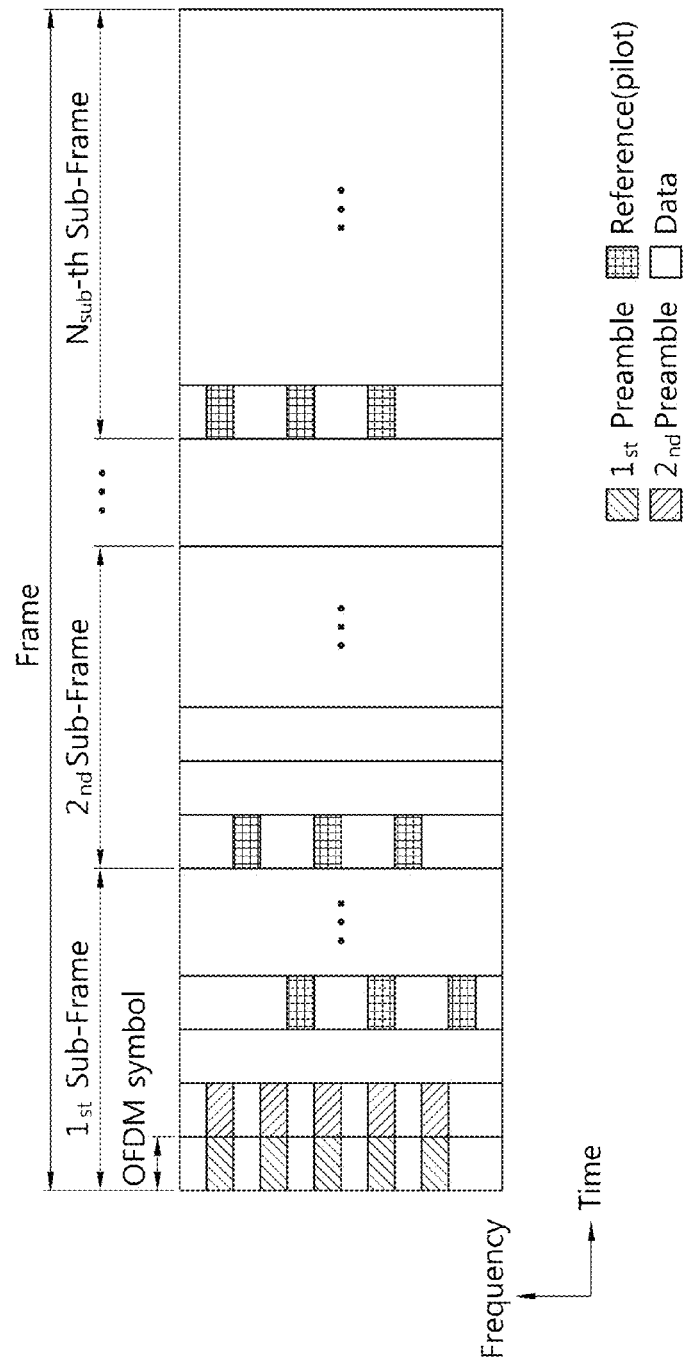
FIG. 3 is a view illustrating a frame structure as shown in FIG. 2 in the frequency domain.

FIG. 3 is a view illustrating a frame structure as shown in FIG. 2 in the frequency domain.

Referring to FIG. 3, each preamble symbol may be generated by mapping $N_P$ (<N) sub-carriers, which are spaced apart from each other at a predetermined distance, among N sub-carriers with a sequence having a length of $N_P$.

Assuming that the sequence for generating a first preamble symbol is $x_{1,1}, x_{1,2}, \ldots, x_{1,N_p}$, a second preamble symbol may be generated through sequence $x_{2,i}=x_{1,i} \cdot c_i$ (i=1, 2, ..., $N_p$). Here, $c_1, c_2, \ldots, c_{N_p}$ is a sequence previously promised between the transmitter and the receiver. Although the sequence previously promised between the transmitter and the receiver may be used equally for all cloud broadcast signals, a different sequence may be used for each terrestrial cloud broadcast signal to distinguish the cloud broadcast signals from each other.

Meanwhile, the pilot symbols positioned in the sub-frames may be generated by mapping the sequence previously promised between the transmitter and the receiver with the positions of the predetermined sub-carriers of all the sub-carriers. At this time, as the pilot symbol, the same sequence may be used for the terrestrial cloud broadcast signals. However, a different sequence may also be used for some terrestrial cloud broadcast signals.

The position of the sub-carrier mapped with the sequence used as the pilot symbol may be the same for multiple terrestrial cloud broadcast signals. However, the pilot sequence may also be mapped with the positions of different sub-carriers for some terrestrial cloud broadcast signals.

Figure 4:
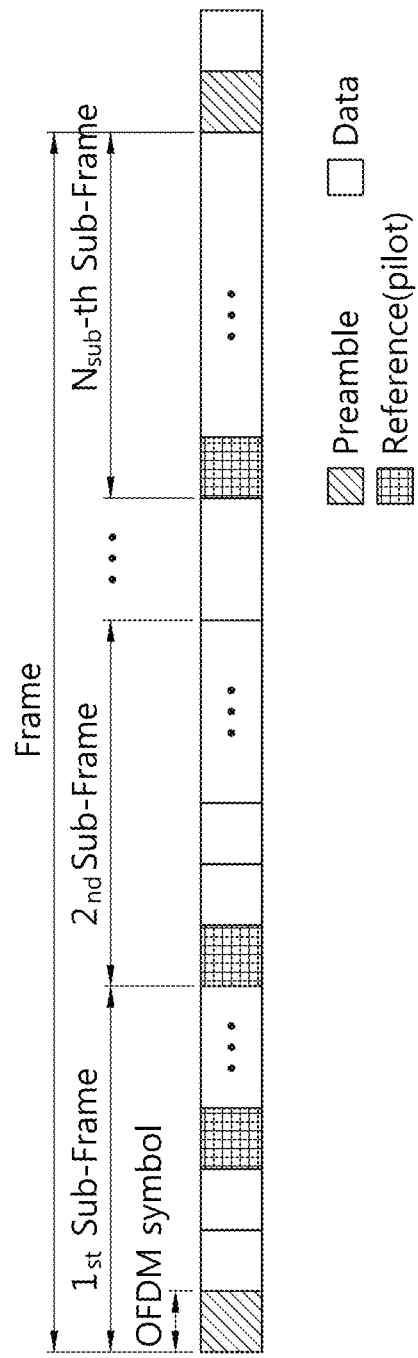
FIG. 4 is a view illustrating a frame structure for transmission and reception of a terrestrial cloud broadcast signal in the time domain according to another embodiment of the present invention.

FIG. 4 is a view illustrating a frame structure for transmission and reception of a terrestrial cloud broadcast signal in the time domain according to another embodiment of the present invention.

Referring to FIG. 4, one frame may consist of Nsub sub-frames, and one sub-frame may consist of one or more OFDM symbols. A first sub-frame may consist of one preamble symbol, one or more pilot symbol, and multiple data symbols. However, in the first sub-frame, the data symbol, instead of the pilot symbol, may also be transmitted. In other words, the first sub-frame may consist only of one preamble symbol and multiple data symbols.

Meanwhile, the preamble symbol may be present at a previously promised position in the sub-frame. The other (Nsub-1) sub-frames each may consist of one or more pilot symbols and data symbols. In all the sub-frames, the pilot symbols may be present at previously promised positions.

Figure 5:
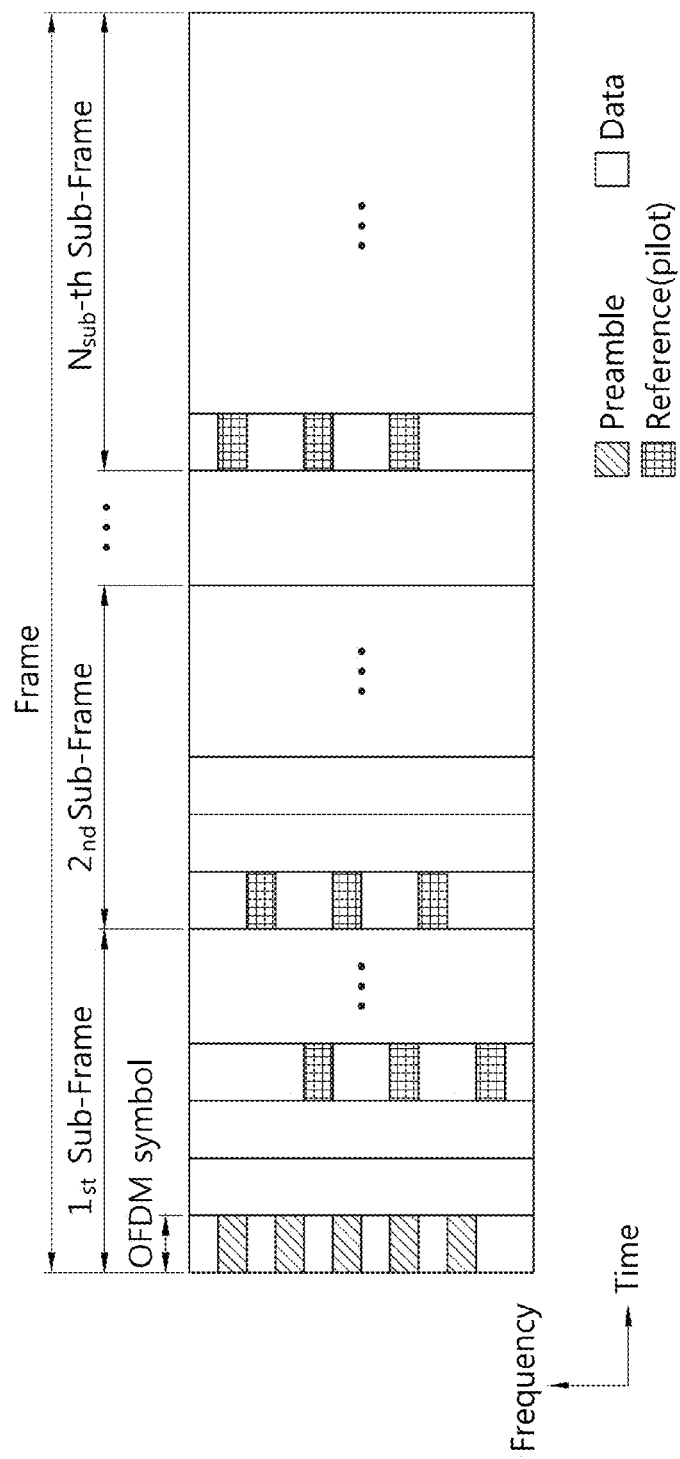
FIG. 5 is a view illustrating a frame structure as shown in FIG. 4 in the frequency domain.

FIG. 5 is a view illustrating a frame structure as shown in FIG. 4 in the frequency domain.

Referring to FIG. 5, the preamble symbol may be generated by mapping $N_P$ (<N) sub-carriers spaced apart from each other at a predetermined distance among N sub-carriers with a sequence having a length of $N_P$. Assuming that the sequence for generating the preamble symbol is $x_1, x_2, \ldots, X_{N_p}$, the preamble symbol may be generated like $x_1=c_1$, $x_{i-1} \cdot c_i$ (i=2, 3, ..., $N_p$). Here, $c_1, c_2, \ldots, c_{N_p}$ is a sequence previously promised between the transmitter and the receiver. The sequence previously promised between the transmitter and the receiver may be used equally for all cloud broadcast signals, and a different sequence may be used for each terrestrial cloud broadcast signal to distinguish the cloud broadcast signals from each other.

Meanwhile, the pilot symbols positioned in the sub-frame may be generated by mapping the sequence previously promised between the transmitter and the receiver with the positions of predefined sub-carriers of all the sub-carriers. At this time, the multiple terrestrial cloud broadcast signals may use the same sequence as the pilot symbol. However, some terrestrial cloud broadcast signals may use different sequences as the pilot symbols.

The position of the sub-carrier mapped with the sequence used as the pilot symbol may be the same for the multiple cloud broadcast signals. However, the pilot sequence may be mapped with the positions of different sub-carriers for some cloud broadcast signals.

The terrestrial cloud broadcast signal transmitting apparatus according to the present invention may use, as an example, an m-sequence or a gold sequence as the preamble sequence.

Figure 6:
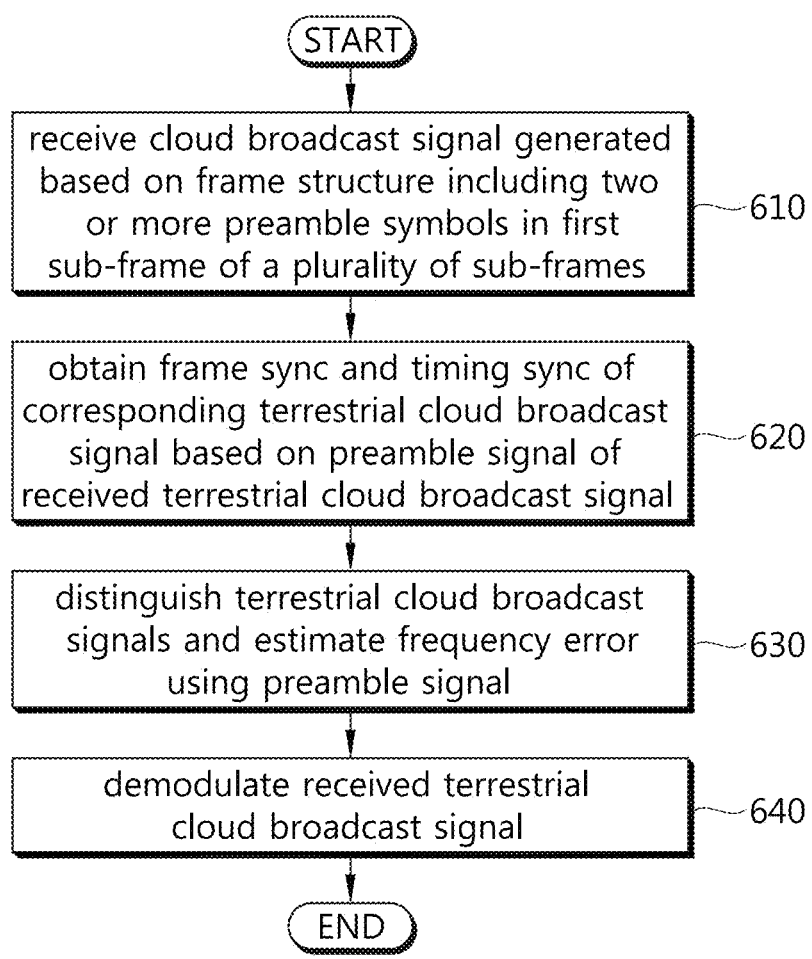
FIG. 6 is a flowchart illustrating a method of demodulating a terrestrial cloud broadcast signal according to an embodiment of the present invention.

FIG. 6 is a flowchart illustrating a method of demodulating a terrestrial cloud broadcast signal according to an embodiment of the present invention.

The terrestrial cloud broadcast signal receiving apparatus according to the present invention may receive one or more cloud broadcast signals having the above-described frame structure. The receiving apparatus may also demodulate one or more terrestrial cloud broadcast signals. For this purpose, the terrestrial cloud broadcast signal receiving apparatus according to the present invention may distinguish the received terrestrial cloud broadcast signals from each other.

The terrestrial cloud broadcast signals which have been transmitted from different transmitters, respectively, have different timing and frequency errors, and thus, the terrestrial cloud broadcast signal receiving apparatus should distinguish and demodulate the terrestrial cloud broadcast signals with the timing and frequency errors not corrected for each terrestrial cloud broadcast signal. Accordingly, the terrestrial cloud broadcast signal receiving apparatus according to the present invention may obtain the frame sync and timing sync of the terrestrial cloud broadcast signal by using the preamble signal. Further, the preamble signal may be used to distinguish the terrestrial cloud broadcast signals from each other and to estimate the frequency error corresponding to an integer multiple of the sub-carrier.

Referring to FIG. 6, the terrestrial cloud broadcast signal receiving apparatus may receive a terrestrial cloud broadcast signal generated, e.g., based on a frame structure for terrestrial cloud broadcast that includes a plurality of sub-frames including a first sub-frame having two or more preamble symbols as shown in FIGS. 2 and 3 (610). At this time, the first sub-frame may include only data symbols, not pilot symbols.

The preamble symbol may be generated by mapping a predetermined number of sub-carriers spaced apart from each other at a predetermined distance on frequency among all the sub-carriers with a sequence whose length corresponds to the number of the predetermined sub-carriers. Among the preamble symbols, the second preamble symbol may be generated by multiplying a sequence for generating the first preamble symbol by a sequence previously promised between the transmitter and the receiver.

The terrestrial cloud broadcast signal receiving apparatus, when receiving such terrestrial cloud broadcast signals, may obtain frame sync and timing sync of a corresponding terrestrial cloud broadcast signal based on the preamble signals of the received terrestrial cloud broadcast signals (620) and may distinguish the terrestrial cloud broadcast signals from each other and may estimate frequency errors (630).

As an example, the terrestrial cloud broadcast signal receiving apparatus may simultaneously obtain an integer frequency error and a preamble sequence by cyclic-shifting, by a frequency error, a FFT (Fast Fourier Transform) output value for a preamble signal and calculating a correlation value for a preamble sequence previously stored in a memory of the terrestrial cloud broadcast signal receiving apparatus and the cyclic-shifted FFT output value.

The terrestrial cloud broadcast signal receiving apparatus, when the preamble sequence is obtained, may demodulate a corresponding terrestrial cloud broadcast signal based on the obtained preamble sequence (640).

Figure 7:
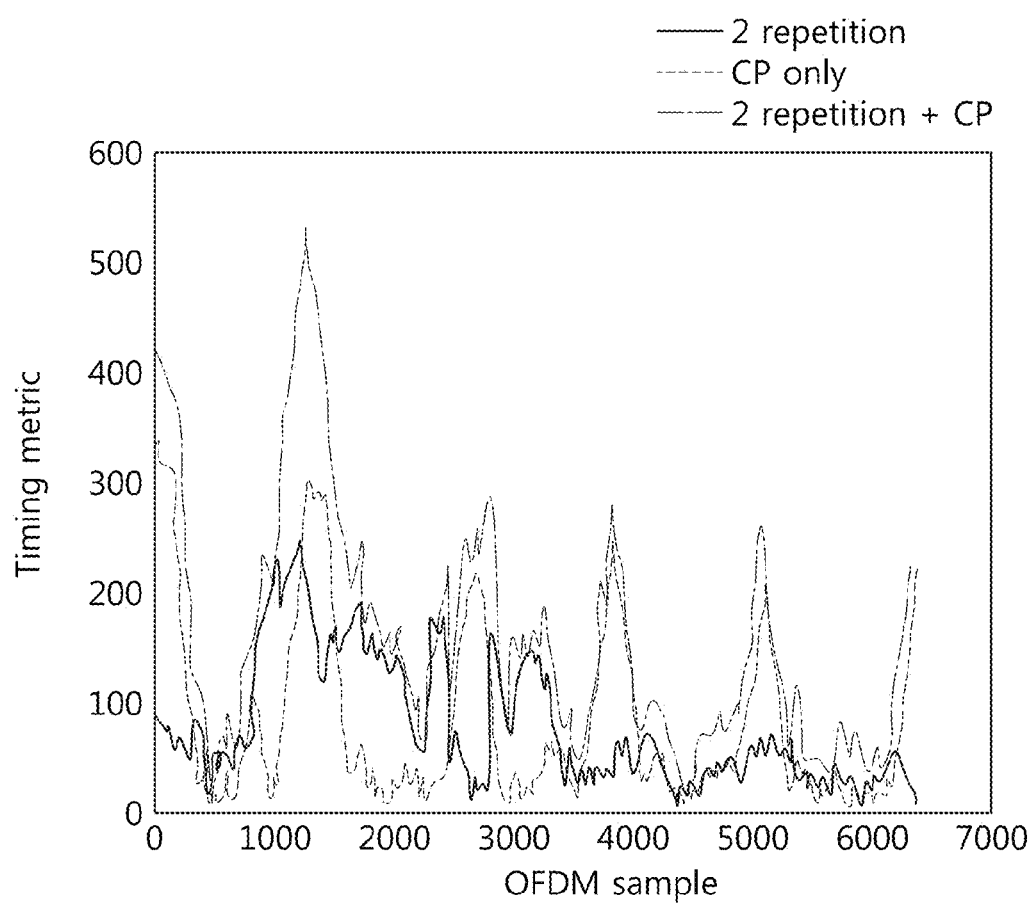
FIG. 7 shows an exemplary computer-simulated result for obtaining initial frame sync and timing sync.

FIG. 7 shows an exemplary computer-simulated result for obtaining initial frame sync and timing sync.

This simulation assumes the following:

FFT size is 1024, cyclic prefix (CP) length is 256, number of effective sub-carriers is 896, and length of preamble sequence is 498.

two terrestrial cloud broadcast signals received by the terrestrial cloud broadcast signal receiving apparatus have the same electric power, go through Brazil A multi-path channel, and each terrestrial cloud broadcast signal has a reception power-to-noise ratio of 0 dB.

second terrestrial cloud broadcast signal arrives at the terrestrial cloud broadcast signal receiving apparatus, while delayed as long time as 180 OFDM samples respective of first terrestrial cloud broadcast signal.

the terrestrial cloud broadcast signal receiving apparatus has frequency errors of 20 ppm and 10 ppm for two terrestrial cloud broadcast signal transmitting apparatuses, respectively.

preamble sequence is allocated to even-numbered effective sub-carriers.

Under the above assumption, the preamble sequence is assigned only to the even-numbered effective sub-carriers, so that the preamble symbol has the same pattern repeating two times in the time domain. Further, the cyclic prefix positioned at the first part of the OFDM symbols is repeated at the last part of the OFDM symbols. Accordingly, the timing metric as shown in FIG. 7 may be acquired by calculating a correlation value between the repeated patterns by using the repeated pattern of the preamble and the repeated pattern of the cyclic prefix. At this time, more correct timing estimation may be achieved by simultaneously using the twice-repeated pattern of the preamble and the repeated pattern of the cyclic prefix.

In the example illustrated in FIG. 7, the 1283th OFDM sample position is estimated by timing. The actual timings of two terrestrial cloud broadcast signals are the 1280th and 1460th OFDM sample positions, respectively. Since the length of the cyclic prefix is 256, and the timings of the two terrestrial cloud broadcast signals are both present within the cyclic prefix period, no inter-symbol interference (ISI) occurs.

Figure 8:
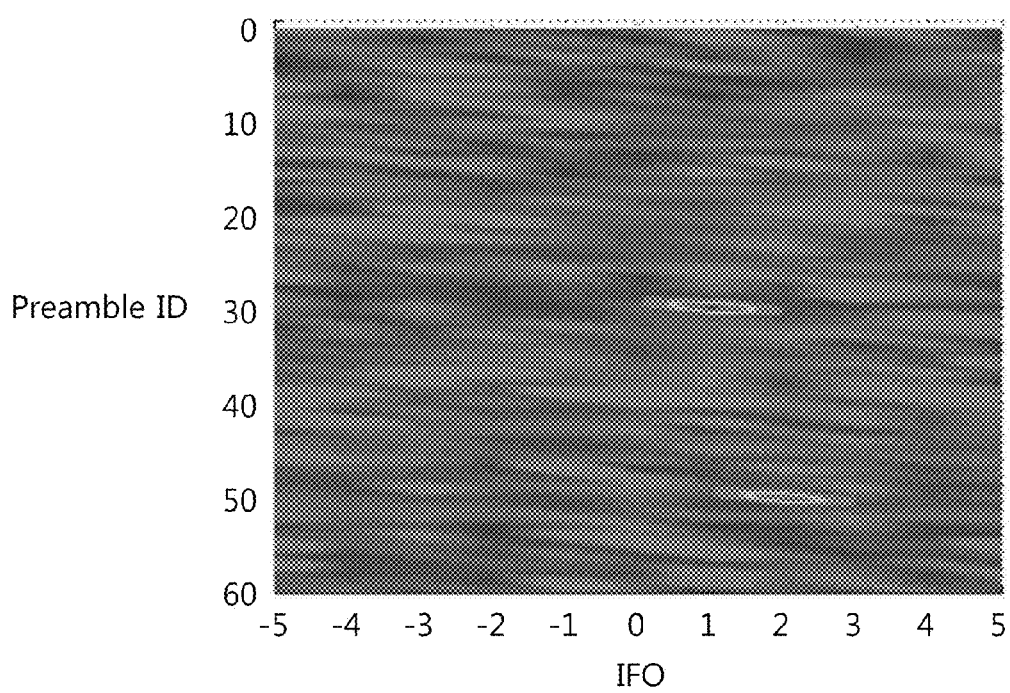
FIG. 8 shows a computer-simulated result of obtaining a unique ID for distinguishing terrestrial cloud broadcast signals from each other and an integer frequency error corresponding to an integer multiple of a sub-carrier frequency interval under the same assumption given for the computer-simulated result shown in FIG. 7.

FIG. 8 shows a computer-simulated result of obtaining a unique ID for distinguishing terrestrial cloud broadcast signals from each other and an integer frequency error corresponding to an integer multiple of a sub-carrier frequency interval under the same assumption given for the computer-simulated result shown in FIG. 7.

In addition to the assumption made in connection with FIG. 7, the following is also assumed:

preamble sequence is used as unique ID, and the preamble is formed using m-sequence.

there are 60 unique IDs for distinguishing terrestrial cloud broadcast signals from each other, the first terrestrial cloud broadcast signal uses the fiftieth ID, and the second terrestrial cloud broadcast signal uses the thirtieth ID.

the first terrestrial cloud broadcast signal has an integer frequency error by the factor of 2, and the second terrestrial cloud broadcast signal has an integer frequency error by the factor of 1.

The terrestrial cloud broadcast signal receiving apparatus cyclic-shifts the FFT output value of the reception preamble by all possible integer frequency errors and may simultaneously obtain the integer frequency error and preamble sequence by calculating a correlation value for all reference preamble sequences and the cyclic-shifted FFT output value. It can be seen in FIG. 8 that the first terrestrial cloud broadcast signal using the fiftieth unique ID has an integer frequency error by the factor of 2, and the second terrestrial cloud broadcast signal using the thirtieth unique ID has an integer frequency error by the factor of 1.

Figure 9:
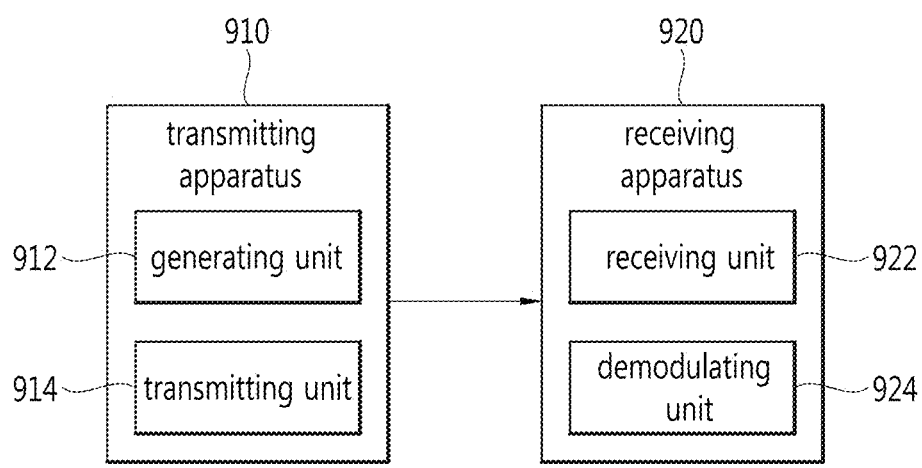
FIG. 9 is a block diagram illustrating a terrestrial cloud broadcast signal transmitting apparatus and a terrestrial cloud broadcast signal receiving apparatus according to an embodiment of the present invention.

FIG. 9 is a block diagram illustrating a terrestrial cloud broadcast signal transmitting apparatus and a terrestrial cloud broadcast signal receiving apparatus according to an embodiment of the present invention.

As shown in FIG. 9, the terrestrial cloud broadcast signal transmitting apparatus 910 according to the present invention includes a generating unit 912 and a transmitting unit 914.

The generating unit 912 may generate a terrestrial cloud broadcast signal, e.g., based on a frame structure for terrestrial cloud broadcast, which includes a plurality of sub-frames including a first sub-frame having two or more preamble symbols as shown in FIGS. 2 and 3. However, the generating unit 912 may also generate a terrestrial cloud broadcast signal based on a frame structure including one preamble symbol in the first sub-frame as shown in FIGS. 4 and 5. Here, the first sub-frame may include the data symbol, instead of the pilot symbol.

Specifically, the generating unit 912 may generate a preamble symbol by mapping a predetermined number of sub-carriers spaced apart from each other at a predetermined distance on frequency among all the sub-carriers with a sequence whose length corresponds to the number of the predetermined sub-carriers. The second preamble symbol may be generated by multiplying a sequence for generating the first preamble symbol by a sequence previously promised between the transmitter and the receiver.

Meanwhile, the generating unit 912 may generate pilot symbols by mapping positions of predefined sub-carriers among all the sub-carriers with the sequence previously promised between the transmitter and the receiver. At this time, the same sequence may be used as the pilot symbol for the terrestrial cloud broadcast signals. However, different sequences may be used for some terrestrial cloud broadcast signals.

The transmitting unit 914 may transmit the terrestrial cloud broadcast signal generated by the generating unit 912.

The terrestrial cloud broadcast signal receiving apparatus 920 may demodulate a terrestrial cloud broadcast signal transmitted from the terrestrial cloud broadcast signal transmitting apparatus 910. For this purpose, the terrestrial cloud broadcast signal receiving apparatus 920 includes a receiving unit 922 and a demodulating unit 924.

The receiving unit 922 receives a terrestrial cloud broadcast signal, and as an example, may receive a terrestrial cloud broadcast signal generated based on a frame structure for terrestrial cloud broadcast, which includes a plurality of sub-frames including a first sub-frame having two or more preamble symbols or may receive a terrestrial cloud broadcast signal generated based on a frame structure including one preamble symbol in the first sub-frame.

The demodulating unit 924 distinguishes the terrestrial cloud broadcast signals from each other based on the preamble signal of the terrestrial cloud broadcast signal received by the receiving unit 922 and demodulates the distinguished terrestrial cloud broadcast signals.

As an example, the demodulating unit 924 may obtain frame sync and timing sync by calculating a correlation value between repeated patterns by using a repeated pattern of the preamble and a repeated pattern of the cyclic prefix. The demodulating unit 924 may obtain a sequence used for the preamble symbol by cyclic-shifting a FFT output value for the preamble signal of the terrestrial cloud broadcast signal by a frequency error and calculating a correlation value for the cyclic-shifted FFT output value and a previously stored preamble sequence. Accordingly, the demodulating unit 924 may demodulate a corresponding terrestrial cloud broadcast signal based on the obtained sequence.

Although embodiments of the present invention have been described for the purpose of description, it will be understood by those of ordinary skill in the art that various modifications or variations may be made thereto without departing from the scope of the present invention defined by the appended claims.

What is claimed is:

1. A method of transmitting a terrestrial cloud broadcast signal by a terrestrial cloud broadcast signal transmitting apparatus, the method comprising:
    generating the terrestrial cloud broadcast signal based on a frame structure for terrestrial cloud broadcast, the frame structure including a plurality of sub-frames, wherein a first sub-frame of the sub-frames includes two or more preamble symbols used to distinguish the terrestrial cloud broadcast signal from a broadcast signal of another transmitting apparatus, and each of the sub-frames of the sub-frames include at least one pilot symbol respectively; and
    transmitting the generated terrestrial cloud broadcast signal.

2. The method of claim 1, wherein each of the sub-frames includes a plurality of OFDM (Orthogonal Frequency Division Multiplexing) symbols.

3. The method of claim 1, wherein the first sub-frame includes a data symbol instead of the pilot symbol.

4. The method of claim 1, wherein the preamble symbols are generated by mapping a predetermined number of sub-carriers spaced apart from each other at a predetermined distance among all sub-carriers with a sequence whose length corresponds to the number of the predetermined sub-carriers.

5. The method of claim 4, wherein a second preamble symbol of the preamble symbols is generated by multiplying a sequence for generating the first preamble symbol by a sequence previously promised between a transmitter and a receiver.

6. The method of claim 5, wherein the sequence previously promised between the transmitter and the receiver is different for each of a plurality of terrestrial cloud broadcast signals so that each of the plurality of terrestrial cloud broadcast signals may be distinguished from each other.

7. The method of claim 1, wherein the pilot symbols in the sub-frames are generated by mapping a predetermined number of sub-carriers of all sub-carriers with a sequence previously promised between a transmitter and a receiver.

8. The method of claim 7, wherein positions of the sub-carriers are the same for a plurality of terrestrial cloud broadcast signals.

9. A method of demodulating a terrestrial cloud broadcast signal by a terrestrial cloud broadcast signal receiving apparatus, the method comprising:
    receiving a terrestrial cloud broadcast signal generated based on a frame structure for terrestrial cloud broadcast, the frame structure including a plurality of sub-frames, wherein a first sub-frame of the sub-frames includes two or more preamble symbols used to distinguish the terrestrial cloud broadcast signal from a broadcast signal of another transmitting apparatus, and each of the sub-frames of the sub-frames include at least one pilot symbol respectively;
    distinguishing terrestrial cloud broadcast signals from each other based on a preamble signal of the received terrestrial cloud broadcast signal; and
    demodulating the distinguished terrestrial cloud broadcast signals.

10. The method of claim 9, wherein the first sub-frame includes a data symbol instead of the pilot symbol.

11. The method of claim 9, wherein the preamble symbols are generated by mapping a predetermined number of sub-carriers spaced apart from each other at a predetermined distance among all sub-carriers with a sequence whose length corresponds to the number of the predetermined sub-carriers.

12. The method of claim 11, wherein a second preamble symbol of the preamble symbols is generated by multiplying a sequence for generating the first preamble symbol by a sequence previously promised between a transmitter and a receiver.

13. The method of claim 9, wherein distinguishing the terrestrial cloud broadcast signals comprises:
    cyclic-shifting a FFT (Fast Fourier Transform) output value for the preamble signal by a frequency error; and
    calculating a correlation value for a previously stored preamble sequence and the cyclic-shifted FFT output value.

14. A terrestrial cloud broadcast signal transmitting apparatus comprising:
    a generating unit generating a terrestrial cloud broadcast signal based on a frame structure for terrestrial cloud broadcast, the frame structure including a plurality of sub-frames, wherein a first sub-frame of the sub-frames includes two or more preamble symbols used to distinguish the terrestrial cloud broadcast signal from a broadcast signal of another transmitting apparatus, and each of the sub-frames of the sub-frames include at least one pilot symbol respectively; and
    a transmitting unit transmitting the generated terrestrial cloud broadcast signal.

15. The terrestrial cloud broadcast signal transmitting apparatus of claim 14, wherein the first sub-frame includes a data symbol instead of the pilot symbol.

16. The terrestrial cloud broadcast signal transmitting apparatus of claim 14, wherein the generating unit generates the preamble symbols by mapping a predetermined number of sub-carriers spaced apart from each other at a predetermined distance among all sub-carriers with a sequence whose length corresponds to the number of the predetermined sub-carriers.

17. The terrestrial cloud broadcast signal transmitting apparatus of claim 16, wherein the generating unit generates a second preamble symbol of the preamble symbols by multiplying a sequence for generating the first preamble symbol by a sequence previously promised between a transmitter and a receiver.

* * * * *